Figure 1:
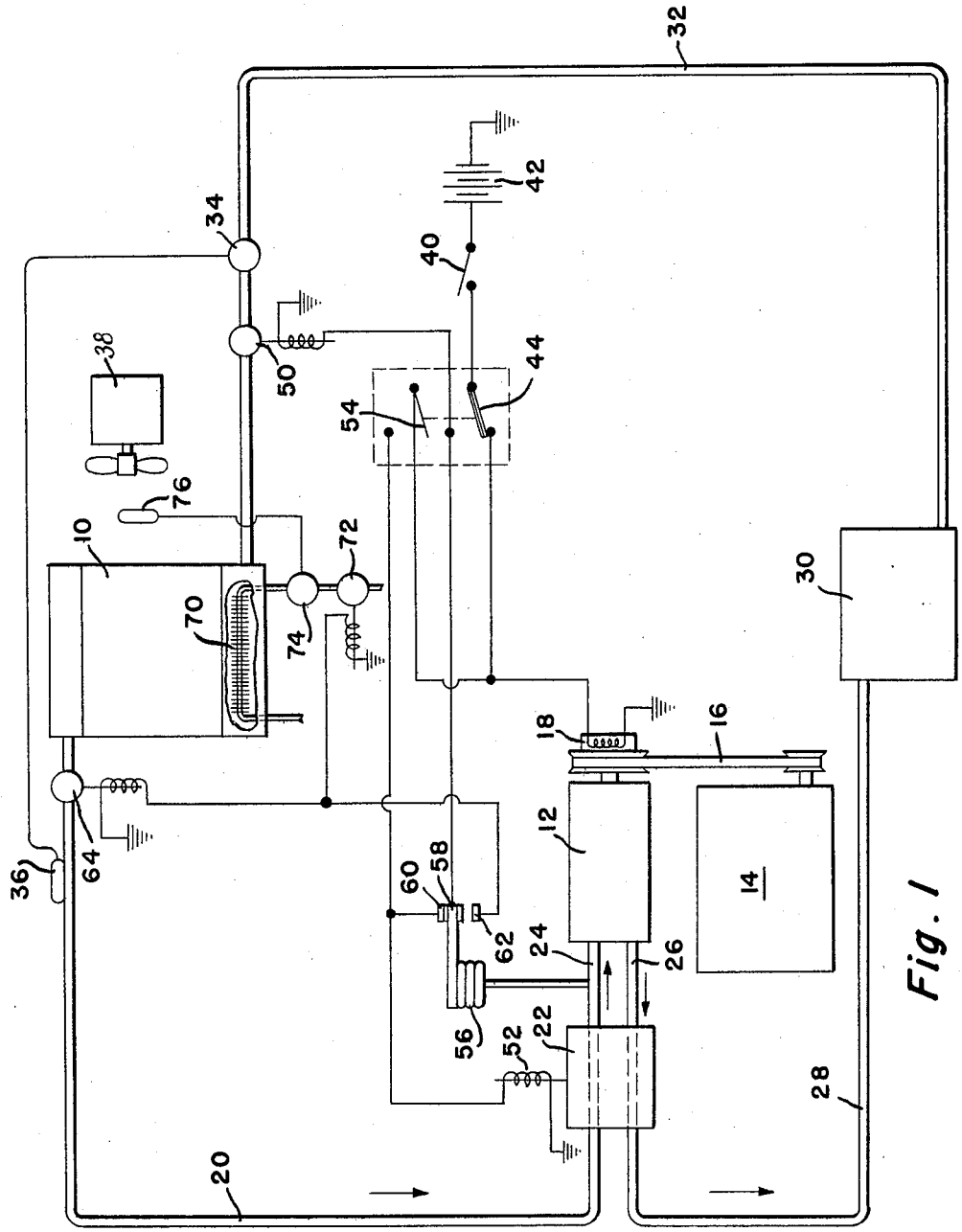

INVENTORS
Richard E. Gould
Charles C. Whistler, Jr.
BY

Their Attorney

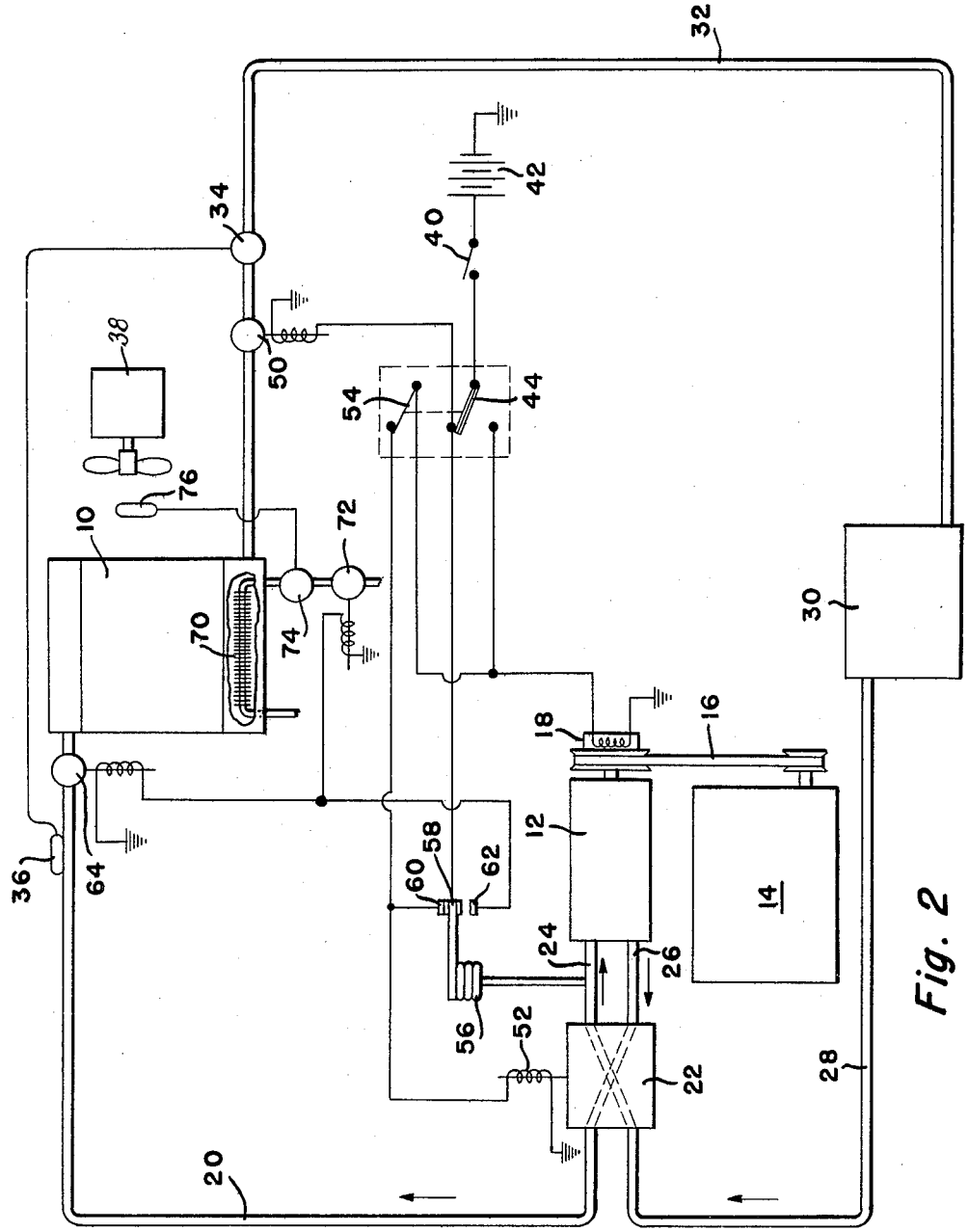

United States Patent Office

3,216,490
Patented Nov. 9, 1965

3,216,490
REFRIGERATING APPARATUS
Richard E. Gould and Charles C. Whistler, Jr., Dayton, Ohio, assignors to General Motors Corporation, Detroit, Mich., a corporation of Delaware
Filed Nov. 28, 1960, Ser. No. 71,982
9 Claims. (Cl. 165—29)

This invention relates to refrigerating apparatus and more particularly to a car heating and cooling system.

It is now customary practice to provide a refrigerating system for cooling the passenger compartment of a car in hot weather and to provide an entirely independent system for heating the car in cold weather. Dual systems of this type are expensive and occupy a large amount of space which is at a premium.

It is an object of this invention to provide a simplified air conditioning system which requires only one air handling system and only one air contacting heat exchange coil.

More particularly, it is an object of this invention to provide a refrigerating system for cooling the air in the passenger compartment whenever cooling is required and to provide means for utilizing the evaporator of that system for heating the air by trapping the refrigerant in the evaporator and applying waste engine heat to the trapped refrigerant which is then used for heating the air.

Further objects and advantages of the present invention will be apparent from the following description, reference being had to the accompanying drawings wherein a preferred embodiment of the present invention is clearly shown.

In the drawings:

FIGURE 1 schematically shows a system for selectively heating or cooling the passenger compartment of a car and shows the controls set for cooling.

FIGURE 2 is a view similar to FIGURE 1 but showing the controls at the beginning of the heating cycle.

Referring now to the drawings wherein a preferred embodiment of the invention has been shown, reference numeral 10 designates a refrigerant evaporator which is arranged in heat exchange relationship with air circulated through the passenger compartment of an automobile. A conventional refrigerant compressor 12 is provided for selectively withdrawing refrigerant from the evaporator 10 or the condenser 30. The compressor 12 is adapted to be driven by means of the main car engine 14 through a belt drive 16. A magnetic clutch 18 is used for declutching the compressor from the car engine for a purpose to be explained more fully hereinafter.

Whenever air cooling is called for, the controls occupy the position in which they are shown in FIGURE 1. In this position of the controls, vaporized refrigerant is withdrawn from the evaporator 10 through a line 20 which leads to a reversing valve 22 arranged between the line 20 and the inlet 24 of the compressor 12. The compressed refrigerant leaves the compressor 12 through the outlet line 26 leading to the reversing valve 22 which serves to connect the compressor outlet 26 to the line 28 leading to a conventional refrigerant condenser 30. During the cooling cycle, the refrigerant which is liquefied by the condenser 30 is supplied to the evaporator 10 through the line 32 in which there is located a conventional thermostatic expansion valve 34 having a temperature sensing bulb 36 located adjacent the outlet of the evaporator 10 in accordance with standard practice.

The refrigerating system thus far described operates like any conventional refrigerating system at all times when cooling of the air is required. A blower or fan 38 is used for circulating air for the passenger compartment of the car into the thermal exchange relationship with the heat exchange element or evaporator 10. A manual control switch 40 is used for turning on and off the air conditioning equipment. The switch 40 is arranged in series with the usual car battery 42 which serves to supply current to all of the air conditioning controls shown in the drawings. A thermostat 44, which is arranged to be responsive to the temperature of the air within the passenger compartment of the car serves to control the air conditioning equipment. When the switch 40 is closed and cooling is required, the thermostat 44 will connect the clutch 18 in circuit so as to cause operation of the refrigerant compressor whenever the car engine 14 operates.

When the temperature in the passenger compartment drops so as to indicate that heating is required, the thermostat 44 will move to the position in which it is shown in FIGURE 2, at which time, current will be supplied to a solenoid valve 50, clutch 18, and the solenoid 52 which, when energized, moves the reversing valve 22 so as to direct the refrigerant as shown in FIGURE 2. Valve 50, when energized, closes the inlet line to the evaporator 10. The thermostat 44 also serves to close the switch 54 when it moves into the position calling for heat. Since the clutch 18 will be energized at the beginning of the heating cycle, the compressor will serve to withdraw refrigerant from the condenser and to direct the compressed refrigerant into the evaporator 10 where the refrigerant will be trapped since the valve 50 is now closed. As the pressure at the inlet of the compressor 12 decreases, the pressure responsive device 56 will serve to cause the contactor 58 to break the circuit at 60 and to make the circuit at 62. Upon closing of the circuit at 62, the solenoid valve 64 will be energized and will trap the main body of refrigerant in the evaporator 10. When the contactor 58 breaks the circuit at 60, the reversing valve will return to its normal position and the clutch 18 will be deenergized so as to stop the operation of the compressor.

With the main portion of the refrigerant charge being trapped in the evaporator 10, it is possible to utilize the evaporator 10 as a heating coil for heating the air for the passenger compartment of the car. This is accomplished by supplying waste engine heat from the engine cooling system to a hot water coil 70 located in the bottom portion of the evaporator 10. When heat is supplied to the coil 70, it will serve to vaporize the liquid refrigerant coming in contact with the heating coil 70 and the refrigerant vapor will flow upwardly in the evaporator where it recondenses and then returns to the bottom of the evaporator. The evaporator then, in effect, becomes a condenser which serves to dissipate into the air for the passenger compartment of the car the heat which is supplied by the hot water coil 70.

During the cooling cycle, the hot water control valve 72 is deenergized and thereby closed so as to prevent any hot water from entering the coil 70 during the cooling cycle. Upon opening of the valve 72 in response to closing of the switch 62, the flow through the heating coil 70 will be controlled by a valve 74 which, in turn, is controlled by a thermostat 76 located in the return air stream so as to respond to the temperature within the passenger compartment of the car. The valve 74 is preferably a modulating type of valve which will open wide when maximum heating is required and will reduce the flow of hot water to the coil 70 when a reduced amount of heating is called for.

While the embodiment of the present invention as herein disclosed, constitutes a preferred form, it is to be understood that other forms might be adopted.

What is claimed is as follows:

1. In an air conditioning system; a compressor having an inlet and an outlet; a condenser having an inlet and an outlet; an evaporator having an inlet and an outlet;

refrigerant flow means for connecting said compressor, condenser and evaporator in series refrigerant flow relationship; fan means directing air to be conditioned over said evaporator; a first valve for closing the inlet to said evaporator; said refrigerant flow means including a reversing valve for connecting the inlet of said compressor to said condenser and means for connecting the outlet of said compressor to said evaporator whereby said compressor serves to withdraw refrigerant from said condenser and discharge the same into said evaporator; a second valve for closing the outlet of said evaporator; means operable to close said first valve when said reversing valve connects the inlet of said compressor to said condenser and when said outlet of said compressor is connected to the outlet of said evaporator; means operable following a predetermined withdrawal of refrigerant from said condenser to close said second valve for trapping substantially all of the refrigerant in said system within said evaporator; and means for supplying heat to the refrigerant thus trapped in said evaporator so as to heat the air to be conditioned.

2. In an air conditioning system; a compressor having an inlet and an outlet; a condenser having an inlet and an outlet; an evaporator having an inlet and an outlet; refrigerant flow means for connecting said compressor, condenser and evaporator in series refrigerant flow relationship; a first valve for closing the inlet to said evaporator; said refrigerant flow means including a reversing valve for connecting the inlet of said compressor to said condenser and means for connecting the outlet of said compressor to the outlet of said evaporator whereby operation of said compressor serves to withdraw refrigerant from the condenser and discharge the same into said evaporator; a second valve for closing the outlet of said evaporator; means operable to close said first valve when said reversing valve is conditioned to connect the inlet of said compressor to said condenser and when said outlet of said compressor is connected to the outlet of said evaporator; means operable following a predetermined discharge of refrigerant into said evaporator to close said second valve for trapping substantially all of the refrigerant in the system within said evaporator; means for supplying heat to the refrigerant thus trapped in said evaporator; and means responsive to a predetermined decrease in pressure at the inlet of said compressor for conditioning said reversing valve to connect the inlet of said compressor to the outlet of said evaporator and connect the outlet of said compressor to the inlet of said condenser.

3. In combination; an automobile having an engine for propelling said automobile; an air conditioning system for selectively heating or cooling a compartment in said automobile; said system including a compressor; a condenser; an evaporator; and refrigerant flow means for connecting said compressor, condenser and evaporator in series refrigerant flow relationship; means drivingly connecting said compressor to said engine including a clutch; a first valve for closing the inlet to said evaporator; means including a reversing valve for reversing the flow of refrigerant in said system whereby said compressor serves to withdraw refrigerant from the condenser and to discharge the same into said evaporator; a second valve for closing the outlet of said evaporator; means operable upon reversal of refrigerant flow in said system for closing said first valve means; means operable in response to a predetermined pressure decrease at the inlet of said compressor to close said second valve for trapping substantially all of the refrigerant in said system within said evaporator; means for supplying heat to refrigerant thus trapped in said evaporator; and means responsive to a predetermined decrease in pressure at the inlet of said compressor for operating said reversing valve and for disengaging said clutch.

4. In an air conditioning system; a compressor; a condenser; an evaporator having an inlet and an outlet; refrigerant flow means for connecting said compressor, condenser and evaporator in refrigerant flow relationship; said refrigerant flow means including means for directing substantially all of the refrigerant in said system into said evaporator when heating is required; a valve for closing the inlet to said evaporator when heating is required; a valve for closing the outlet of said evaporator operable when substantially all of the refrigerant is directed into said evaporator; and means for supplying heat to the refrigerant in said evaporator.

5. In an automobile air conditioning system; a compressor; a condenser; an evaporator having an inlet and an outlet; refrigerant flow means for connecting said compressor, condenser and evaporator in series refrigerant flow relationship; said refrigerant flow means including means for reversing the flow of refrigerant in a portion of said system so as to collect the major portion of the refrigerant in said evaporator when heating is required; a valve closing the inlet to said evaporator operable upon reverse flow in said system; a valve closing the outlet of said evaporator operable once a major portion of the refrigerant has been collected in said evaporator for trapping the refrigerant therein; and means for supplying heat to the refrigerant in said evaporator.

6. In an air conditioning system; a compressor; a condenser; an evaporator having an inlet and an outlet; conduit means for directing refrigerant from said compressor into said condenser and thereafter into said evaporator; refrigerant flow means for connecting said evaporator in refrigerant flow relationship with said compressor; a valve for closing the inlet to said evaporator; said refrigerant flow means including means operatively associated with said condenser for collecting the major portion of the refrigerant in said system in said evaporator including means for reversing the flow of refrigerant through said conduit means; means including a second valve for thereafter closing the outlet of said evaporator for trapping the major portion of refrigerant within said evaporator; and means for supplying heat to the refrigerant so trapped in said evaporator.

7. In an air conditioning system; a compressor; a prime mover for said compressor; means for declutching said compressor from said prime mover; a condenser; an evaporator having an inlet and an outlet; refrigerant flow means for connecting said compressor, condenser and evaporator in series refrigerant flow relationship; said refrigerant flow means including means for connecting the outlet of said compressor directly to said evaporator and further including means operatively associated with said compressor for directing substantially all of the refrigerant in said system into said evaporator; trapping means including a first valve for closing the inlet to said evaporator and a second valve for closing the outlet of said evaporator when substantially all of the refrigerant in said system is within said evaporator; and means for supplying heat to the refrigerant in said evaporator; and means responsive to a given pressure at the inlet to said compressor for declutching said compressor.

8. In an air conditioning system; a compressor; a condenser; an evaporator having an inlet and an outlet; refrigerant flow means for connecting said compressor; condenser and evaporator in refrigerant flow relationship; said refrigerant flow means including flow-directing means for passing substantially all of the refrigerant in said system into said evaporator when heating is required; said flow directing means including means for connecting the outlet of said compressor to the outlet of said evaporator; a valve for closing the inlet to said evaporator when heating is required; a valve for closing the outlet of said evaporator operable when substantially all of the refrigerant is passed into said evaporator; and means for supplying heat to the refrigerant in said evaporator.

9. In an air conditioning system for the passenger compartment of an automobile; a compressor, a condenser; an evaporator having an inlet and an outlet; refrigerant flow means for connecting said compressor; condenser and evaporator in refrigerant flow relationship; said refrigerant flow means including flow-directing means for passing substantially all of the refrigerant in said system into said evaporator when heating is required; said flow-directing means including means for connecting the outlet of said compressor to the outlet of said evaporator; a valve for closing the inlet to said evaporator when heating is required; a valve for closing the outlet of said evaporator operable when substantially all of the refrigerant is passed into said evaporator; means for supplying heat to the refrigerant in said evaporator; and means responsive to heating requirements in the passenger compartment for varying the amount of heat applied to said refrigerant in said evaporator.

References Cited by the Examiner

UNITED STATES PATENTS

| | | | |
|---|---|---|---|
| 2,715,317 | 8/55 | Rhodes | 62—160 X |
| 2,756,970 | 7/56 | Hermann | 165—22 |
| 2,780,442 | 2/57 | Breeding | 165—17 |
| 2,829,869 | 4/58 | Philipp | 165—62 |
| 2,988,896 | 6/61 | Swart | 62—160 |
| 3,024,008 | 3/62 | Blum | 165—22 |

CHARLES SUKALO, *Primary Examiner.*

HERBERT L. MARTIN, FREDERICK L. MATTESON, JR., *Examiners.*